United States Patent [19]

Shiroki

[11] Patent Number: 4,865,120
[45] Date of Patent: Sep. 12, 1989

[54] FLOOR STRUCTURE FOR HEATING

[76] Inventor: Shigetomo Shiroki, 56-20, Goko Matsumi, Matsudo City, Chiba Prefecture, Japan

[21] Appl. No.: 160,994

[22] Filed: Feb. 26, 1988

[51] Int. Cl.$^4$ .......................... F24H 3/10; F24H 7/06
[52] U.S. Cl. ...................................... 165/56; 165/47; 165/171; 237/69
[58] Field of Search ............... 165/49, 56, 10, 171, 165/170; 237/69, 75

[56] References Cited

U.S. PATENT DOCUMENTS

| | | | |
|---|---|---|---|
| 2,681,796 | 6/1954 | Rapp | 165/56 |
| 3,037,746 | 6/1962 | Williams | 165/170 |
| 4,212,348 | 7/1980 | Kobayashi | 237/69 |

FOREIGN PATENT DOCUMENTS

| | | | |
|---|---|---|---|
| 2705146 | 8/1978 | Fed. Rep. of Germany | 165/171 |
| 0099592 | 7/1980 | Japan | 165/56 |
| 0108531 | 7/1982 | Japan | 165/56 |
| 0035337 | 3/1983 | Japan | 237/69 |
| 0095321 | 6/1984 | Japan | 165/56 |
| 0158919 | 9/1984 | Japan | 165/56 |
| 0225228 | 12/1984 | Japan | 165/56 |

Primary Examiner—Albert W. Davis, Jr.
Assistant Examiner—John K. Ford
Attorney, Agent, or Firm—A. W. Breiner

[57] ABSTRACT

The present invention provides a floor structure for heating a timber-framed house, with which the floor of the house can be kept warm for a while even after the circulation of hot water in the hot water pipe has been stopped, whereas the pipe can be reduced in length as well. In achieving an object as above, a floor structure for heating according to the present invention comprises: a wooden board; a wooden frame secured on the wooden board; a heat accumulating layer which is inserted and fitted inside the frame on the wooden board; a plurality of grooves extending from one edge of the wooden frame by way of the surface of the heat accumulating layer to the other edge relative to the one end thereof; and a metal plate which is inserted in these grooves, covers the surface of the heat accumulating layer and its contiguous surface of the wooden frame, and is fitted on the wooden frame.

8 Claims, 2 Drawing Sheets

FLOOR STRUCTURE FOR HEATING

DETAILED DESCRIPTION OF THE INVENTION

This invention relates to a floor structure which is used mainly for heating timber-framed houses.

Conventionally, in a floor heating structure formed on a rough floor of a timber-framed house, a base board 10 integrally formed with a metal plate 6 which is disposed along the grooves 5 and surface of an insulation board 1 is placed on the rough floor, a hot water pipe 9 being located in the grooves 5, and a plywood 7 being placed over the pipe and fixed on a rough board with the base board which is penetrated by nails, are disposed on the insulation board 1 which comprises a plurality of grooves 5 each extending from one end to the other of the insulation board 1, as shown in FIG. 3. Then, a carpet is placed over it, or a flooring material is placed instead of the plywood 7 or the rough board is fitted on the base board 10 with nails being penetrated therethrough, thereby a floor is formed. In this structure, there is such a problem as one in which the room temperature falls immediately when the circulation of hot water in the hot water pipe 9 stops, because the metal plate 6 is used for equally transferring a heat which is to be supplied to the floor by way of the hot water pipe 9. The metal plate 6 is provided in order for the heat transferred through the hot water to also be dissipated from the surface thereof into the inside of the room and the heat to be equally dissipated from the entire surface of the floor, whereas an interval between one groove to the other in which a portion of the pipe 9 is located must be reduced so as to make the temperature in the middle part of the solid portion of the interval nearly the same as that in the peripheral part of the solid portion of the interval which is closer to the portion of the pipe 9 than the former. There is also such a problem as one in which the length of the pipe must be arranged long when each of the intervals between the pipe portions placed in their respective grooves is arranged small or, the difference of temperature from that at the peripheral part of the inlet of the hot water pipe and that at the peripheral part of the outlet of the same becomes large when the length of the pipe is arranged long.

An object of the present invention is to provide a floor structure for heating, with which the floor can be kept warm for a while even after the circulation of hot water in the pipe has been stopped, whereas the pipe can be reduced in length as well.

In order to achieve an object as described above, a floor structure for heating according to the present invention comprises: a wooden board; a wooden frame secured on the wooden board; a heat accumulating layer which is inserted and fitted inside the frame on the wooden board; a plurality of grooves extending from one edge of the wooden frame by way of the surface of the heat accumulating layer to the other edge of the wooden frame relative to the one edge thereof; and a metal plate which is inserted in these grooves, covers the surface of the heat accumulating layer and its contiguous surface of the wooden frame, and is fitted on the wooden frame.

Besides each of the intervals between the grooves for the pipe portions can be set large in the piping and the length of the entire pipe for hot water can be reduced, the floor of a house can be kept warm for a while even after the circulation of hot water in the pipe has been stopped, because of the temperature in the floor having been maintained equally by means of the heat accumulating layer.

AN EMBODIMENT OF THE PRESENT INVENTION

Figure 1:
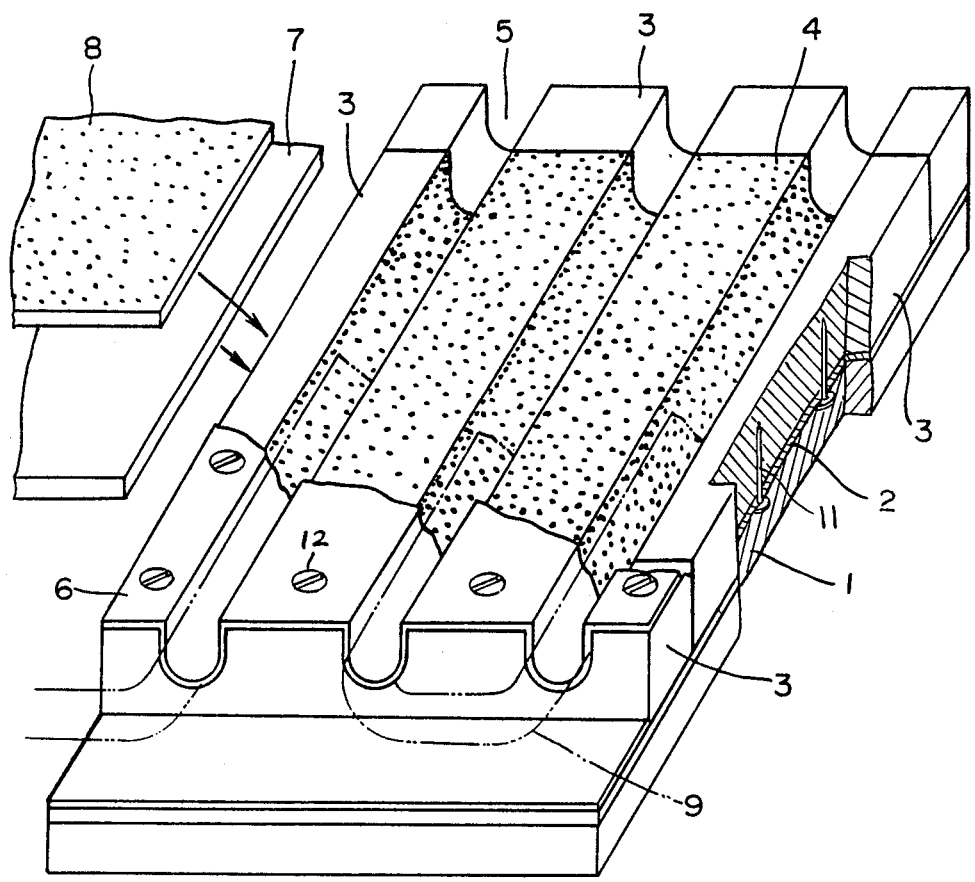
FIG. 1 is a partially cutaway view in perspective of a floor structure for heating of an embodiment according to the present invention.
Figure 2:
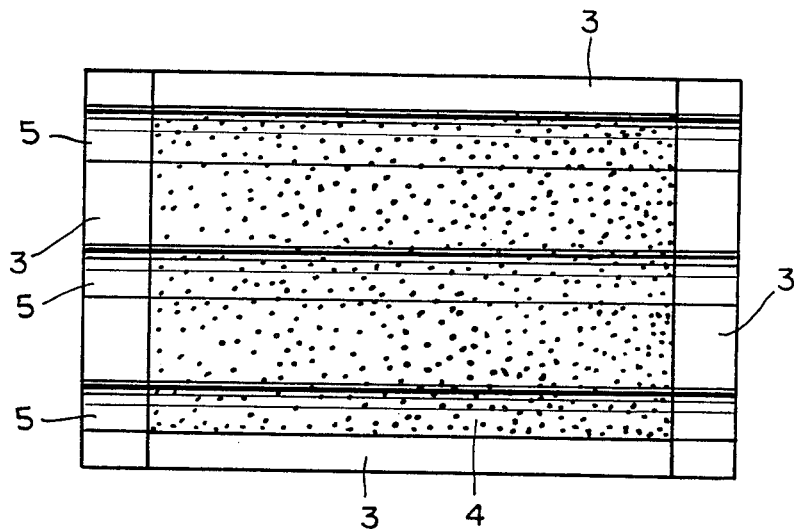
FIG. 2 is a plan view wherein a wooden frame and heat accumulating board in FIG. 1 are combined together.
Figure 3:
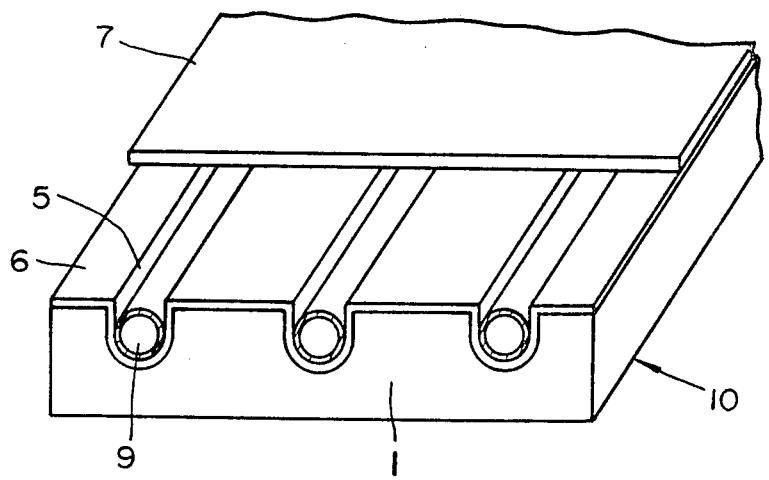
FIG. 3 is a perspective view of a conventional structure for floor heating.

Referring to a floor structure of an embodiment according to the present invention as illustrated in the drawings, a wooden frame 3 is secured on a wooden board 2 which comprises a plywood and the like into a square-shaped frame by means of nails 11. A heat accumulating layer 4 which comprises a heat accumulating composite such as a concrete layer and similar is inserted and fitted inside the frame 3. On the surfaces of the frame 3 and heat accumulating layer 4, a plurality of grooves 5 are formed by way of the heat accumulating layer in parallel with each other, which extend from one edge of the wooden frame 3 to the other edge relative to the one edge thereof. On the surfaces of the heat accumulating layer 4 and wooden frame 3, there is a metal plate 6 which is inserted into the grooves 5, covers these entire surfaces, and is fixed on the wooden frame 3 by means of screws 12. An insulation board 1 is fitted on the bottom surface of the wooden board 2.

In this floor structure, the grooves 5 are disposed such that they may form continuous grooves on a rough floor, and they are fixed on this rough floor by means of the wooden frame 3. Then, a hot water pipe 9 made of either a metal or plastic is disposed in the grooves 5 on the metal plate 6, thereby the floor is finished with an application of a floor finishing material 8 or flooring material such as carpet onto the plywood 7 after a plywood 7 having been placed and fixed on the wooden frame 3 by means of nails and the like.

Since a floor structure according to the present invention is integrally formed with the heat accumulating plate 4 which has been supported by the wooden board 2, wooden frame 3 and metal plate 6, floor finishing materials and similar can be fitted by virtue of the wooden frame 3 while the floor temperature can be further equalized by virtue of the heat accumulating layer, thereby the pipe can be reduced in length and the floor can be kept warm for a while even after the circulation of hot water has been stopped. Also, since the metal plate 6 has a heat dissipating effect, the floor temperature can be raised immediately at the time of start of heating and the hot water pipe can be replaced easily by the plywood 7 being removed.

What is claimed is:

1. A floor heating element having a layered structure comprising from bottom to top a thermal insulating member, a first wooden member disposed on said thermal insulating member, a wooden frame secured on said first wooden member, a heat accumulating composite inserted into said wooden frame, each of said wooden frame and said heat accumulating composite having a plurality of spaced and substantially parallel grooves extending from one end of said wooden frame to the other end thereof and extending through the surface of said heat accumulating composite, a metal plane having a plurality of spaced and substantially parallel grooves mated to said grooves in said wooden frame and said heat accumulating composite and secured to said wooden frame so as to cover said wooden frame and said heat accumulating composite, and a second wooden member disposed on said metal panel and fixedly secured to said metal panel so as to cover said metal panel.

2. The floor heating element according to claim 1 wherein said first and second wooden members are plywood.

3. The floor heating element according to claim 1 wherein said heat accumulating composite comprises concrete.

4. The floor heating element according to claim 3 wherein said metal panel is fixed to said wooden frame with screws.

5. The floor heating element according to claim 4 wherein a floor finishing material is applied onto said plywood.

6. The floor heating element according to claim 1 including hot water pipes contained in said parallel grooves.

7. The floor heating element according to claim 6 wherein said hot water pipes are metal.

8. The floor heating element according to claim 6 wherein said hot water pipes are plastic.

* * * * *